United States Patent [19]

Frazier

[11] Patent Number: 5,081,523
[45] Date of Patent: Jan. 14, 1992

[54] DISPLAY IMAGE CORRECTION SYSTEM AND METHOD
[75] Inventor: Gary A. Frazier, Garland, Tex.
[73] Assignee: Texas Instruments Incorporated, Dallas, Tex.
[21] Appl. No.: 378,950
[22] Filed: Jul. 11, 1989
[51] Int. Cl.$^5$ .................... H04N 9/64; H04N 9/73; H04N 17/02
[52] U.S. Cl. ...................... 358/29; 358/27; 358/10; 358/139
[58] Field of Search ................. 358/29, 314, 316, 27, 358/25, 28, 67, 71, 80, 10, 69, 139

[56] References Cited
U.S. PATENT DOCUMENTS

| | | | |
|---|---|---|---|
| 4,001,877 | 1/1977 | Simpson | 358/10 |
| 4,159,484 | 6/1979 | Strathman | 358/67 |
| 4,379,292 | 4/1983 | Minato et al. | 358/29 |
| 4,551,653 | 11/1985 | Hilsum | 358/69 |
| 4,688,079 | 8/1987 | Fendley | 358/10 |
| 4,706,108 | 11/1987 | Kumagai et al. | 358/29 |
| 4,733,227 | 3/1988 | Kanema et al. | 358/10 |
| 4,742,387 | 5/1988 | Oshima | 358/29 |
| 4,746,970 | 5/1988 | Hosokawa et al. | 388/10 |

Primary Examiner—Victor R. Kostak
Assistant Examiner—Michael H. Lee
Attorney, Agent, or Firm—Richard A. Stoltz; Rene E. Grossman; Richard L. Donaldson

[57] ABSTRACT

A display image correction system (20) corrects display image errors by detecting deviations in the display image from the input image on a pixel-by-pixel basis. The image correction system detects pixel output, and then provides correction signals to the display system's image generator for correcting display image errors (such as intensity errors, or for color systems, RGB color errors). For a color CRT display system with a single-beam image generator, the image correction system (20) includes RGB pixel color output detectors (22R, 22G, 22B) and an image correction subsystem (24). For each pixel the display image, the RGB detectors (22R, 22G, 22B) detect component color amplitude, providing corresponding detector signals to the image correction subsystem (24). The image correction subsystem corrects pixel color output errors by providing position correction signals to the display's image generator (14), repositioning the image beam within the pixel relative to the constituent RGB color phosphors, and corrects intensity errors by providing an intensity correction signal that adjusts beam current. The image correction method is adaptable to a wide variety of display systems, such as CRT monochrome and color displays, and fixed-position LCD and LED displays. It can operate on a real time basis using feedback of detected pixel output from a display image, or on a sampled basis using stored correction factors calculated from a test image. An analog implementation of the image correction subsystem (24) is used for the real-time application (FIGS. 5A and 5B), while a digital implementation is used for the sampled-test-image application (FIG. 6).

15 Claims, 5 Drawing Sheets

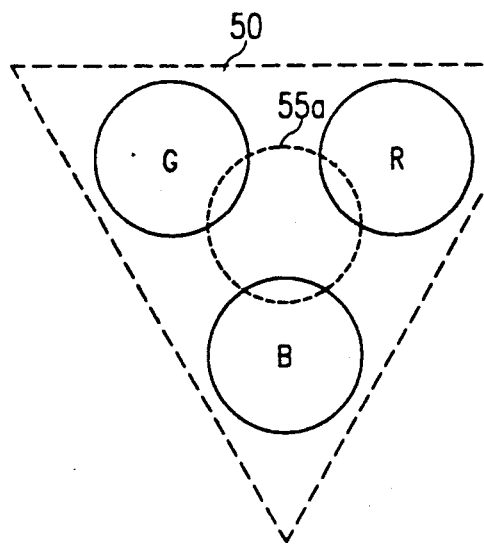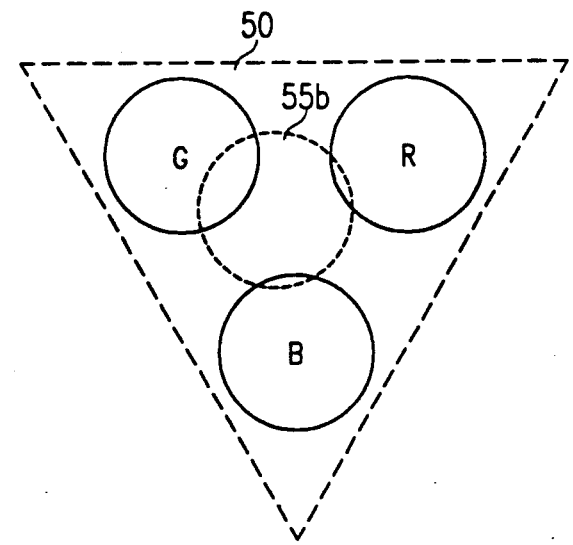
Nominal
FIG. 4a
Actual
FIG. 4c
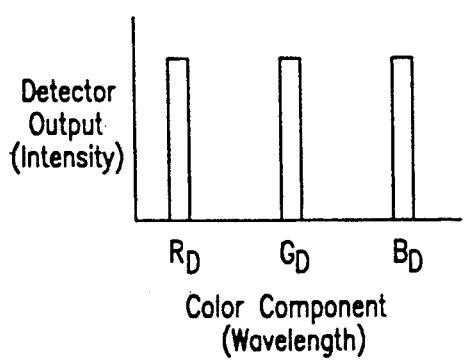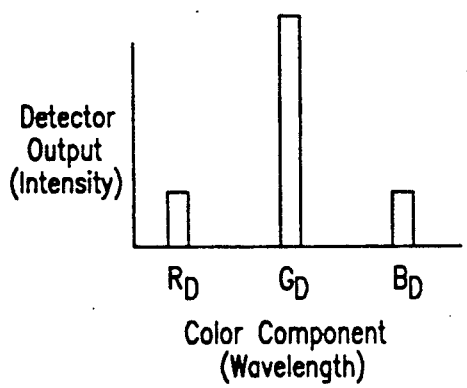
FIG. 4b
FIG. 4d

DISPLAY IMAGE CORRECTION SYSTEM AND METHOD

TECHNICAL FIELD OF THE INVENTION

This invention relates generally to image display systems, and more particularly relates to an image correction system and method for correcting images pixel-by-pixel on a sampled basis using stored correction factors calculated from detected pixel output for a test image, and even more particularly relates to correcting color CRT images by correcting deviations in beam position and/or intensity.

BACKGROUND OF THE INVENTION

Color displays using raster-scanned cathode ray tube technology rely upon accurately controlling the position and intensity of an image beam scanned in a raster pattern to produce a displayed color image. Future high resolution CRT displays, including those for high definition television, will require even more performance in controlling image beam deflection and/or intensity to present an accurate color image.

A color CRT tube includes a phosphor-coated display screen and an electron beam generator. The phosphor coating on the display defines an array of picture elements (pixels), with each pixel including three color phosphor elements—red, green and blue (RGB). CRT systems use electron beam generators with either one or three image beams. In single-image-beam systems, the color image is a composite produced by precisely controlling the position of the image beam within each pixel relative to the three color elements (providing a composite color output corresponding to the color component ratio) as the beam is raster-scanned over the pixel array. In three-image-beam systems, the color image is a superposition of three color component images produced by separately controlling the intensities of each beam as they are scanned across respective color elements of a pixel.

A significant cost factor in producing high resolution color picture tubes is the need to provide a highly reliable and uniform phosphor screen coating with phosphor color coating elements that do not degrade in color, profile or response time during the anticipated life of the display device. In addition, the accuracy and reliability of the electron beam focusing and positioning components is important, and is critical in single-image-beam systems where slight variations in beam position within a pixel can cause color distortions.

Several mechanisms cause deterioration in color image quality over the life of a color CRT system. Phosphors inevitably lose efficiency in converting electron impact energy into optical radiation. Nonuniformities in phosphor thickness and chemical quality also show up as variations in image intensity and color accuracy. Many CRT applications require that some part of the screen receive much more electron beam excitation than others (such as closed captions and software menus), so that phosphor degradation can occur at different rates over the screen. Different color phosphors will degrade over time at different rates, with blue phosphor tending to have a longer life than red phosphor. In addition, electronic component degradation and mechanical misalignments, as well as locating the CRT display next to other electronic equipment, can cause unpredictable distortions in the magnetic or electronic fields used to control beam deflection.

Many of these mechanisms also adversely affect the image quality of monochrome displays. In addition, other display technologies—such as LCD and LED—experience image quality problems. In particular, while LCD and LED systems do not require any beam positioning as in CRT systems, they do experience significant problems in controlling intensity at the pixel level. For LED displays, diodes with uniform light output (intensity) are difficult to produce in quantity, so that improving "pixel" image quality requires more stringent component selection criteria that increase expense. For LCD displays, variations in capacitive field strength between row/line conductors cause variations in light output (intensity) for a "pixel", and therefore, adversely affect image quality.

Accordingly, a need exists for a system for correcting display image distortions at the pixel level, whether caused by errors in intensity or other factors such as positioning an image beam, based on detected image errors in the output display image.

SUMMARY OF THE INVENTION

The present invention corrects display image errors by generating corresponding pixel image correction factors that are used to correct the display image on a pixel-by-pixel basis. Exemplary pixel image attributes for a color CRT system are RGB pixel component color amplitudes, which relate to beam position and/or beam intensity. Correction factors are generated using stored correction factors generated by periodic sampling of test images.

In one aspect, the display image correction system and method of this invention is used in connection with an image display system that includes an array of picture elements, and an image generator responsive to an input image signal for generating a corresponding image on the display. The image correction system includes an image detector subsystem and an image correction subsystem. The image detector detects selected pixel image-attributes of the display image, and provides corresponding image detector signals.

The image correction subsystem samples test images, detecting the pixel image-attributes for the displayed test image and generating correction factors that are stored in an image correction memory map. These stored image correction factors are then retrieved by the image correction subsystem in synchronism with the input image signal, and provided to the image generator to correct the displayed image.

In its more specific aspects, the display image correction system is used with a color CRT system to provide display image color and intensity correction by correcting image beam position and/or image beam intensity. The CRT system's color display includes a phosphor coating that forms lines of pixels, each including RGB color phosphors arranged in a triangular pattern. The CRT system's image generator uses a single image beam, and is responsive to the input video signal to control electron beam current, which controls image beam intensity, and to control image beam position within a pixel (relative to the RGB color phosphors), which controls the composite color output for the pixel.

The image detector subsystem includes separate RGB component color amplitude detectors that, for each pixel, provide respective component color detector signals $R_D G_D B_D$ representative of color-amplitude output of the color phosphors for that pixel, and therefore, representative of image beam position within the pixel. The image correction subsystem includes a test image generator that intermittently displays test images of a sufficiently short duration to be imperceptible to a viewer. For each test image, the image correction subsystem compares the input test image with the output color display image on a pixel-by-pixel basis, and generates correction factors for each pixel that are stored in corresponding image correction memory maps. For a single beam CRT system, the correction factors include two positional correction factors (delta-X and delta-Y) and an intensity correction factor. In synchronism with the CRT raster scan, the image correction subsystem sequentially retrieves image correction factors for each pixel and provides them to the CRT image generator to control image beam position and/or intensity.

The technical advantages of the display image correction system and method of this invention include the following. The display image correction method is adaptable to a wide variety of display systems, including positionally fixed displays (LED and LCD), and CRT displays, both monochrome and color (including single-beam and three-beam). It is adaptable to either analog or digital implementations, with the analog implementation being preferred for a real-time-feedback application, and a digital implementation being preferred for sampled-test-image application with stored-correction-factors. For CRT systems, it is adaptable to correcting either image beam intensity or position, or both. For real-time applications, a display image detection/correction feedback loop allows real-time correction of the displayed image on a pixel-by-pixel basis. For sampled-test-image applications, calculating correction factors by sampling test images on a pixel-by-pixel basis allows these correction factors to be generated and stored independent of a video input signal, with any desired sequence or frequency, and then read out in synchronism with the input video signal to provide a corrected display color image.

BRIEF DESCRIPTION OF THE DRAWINGS

For a more complete understanding of the present invention and other features and advantages, reference is now made to the following Detailed Description, read in conjunction with the accompanying Drawings, in which:

FIGS. 4a and 4b illustrate an RGB picture element illuminated by an image beam, and the corresponding RGB color amplitude levels;

FIGS. 4c and 4d illustrate an RGB picture element with a beam-positioning error that causes a distorted composite color output as represented by changes in color amplitude levels;

DETAILED DESCRIPTION OF THE INVENTION

The preferred embodiment of the display image correction system and method is described in connection with a display system that uses a color cathode ray tube (CRT) with a single image beam. Two alternative image correction applications are described—real-time feedback using the detected image, and stored-correction-factor using sampled test images. The display image correction system detects and corrects both beam positioning and intensity errors at the picture element level.

The display image correction techniques embodied in this invention are readily adaptable by those skilled in the art to other display systems. In particular, adapting the intensity correction aspects of this invention to a three-image-beam CRT system is described, and their further adaptability to CRT monochrome and non-CRT systems (such as LCD and LED displays) is apparent to those skilled in the art.

The Detailed Description is organized as follows:
1. CRT Display System
2. Display Image Correction System
3. Beam Position Detection
4. Image Correction Subsystem (Real-Time)
5. Image Correction Subsystem (Stored-Correction-Factor)
6. Positionally Fixed Display Systems
7. Conclusion The color CRT image correction system detects, for each picture element (pixel), the output color amplitude from each of the RGB phosphor elements, generating corresponding component color amplitude detector signals. These RGB detector signals are processed, using the input video signal as a reference, to generate a beam position correction signal used to correct beam position for that pixel (relative to the constituent color phosphor elements). For the preferred embodiment, the image correction system operates in real time using analog signal processing to provide the necessary bandwidth for real-time beam position correction. In an alternative embodiment, digital signal processing is used to periodically sample color display accuracy, and to calculate for each pixel a beam position correction factor that is stored for table-lookup image correction.

1. CRT Display System

Figure 1:
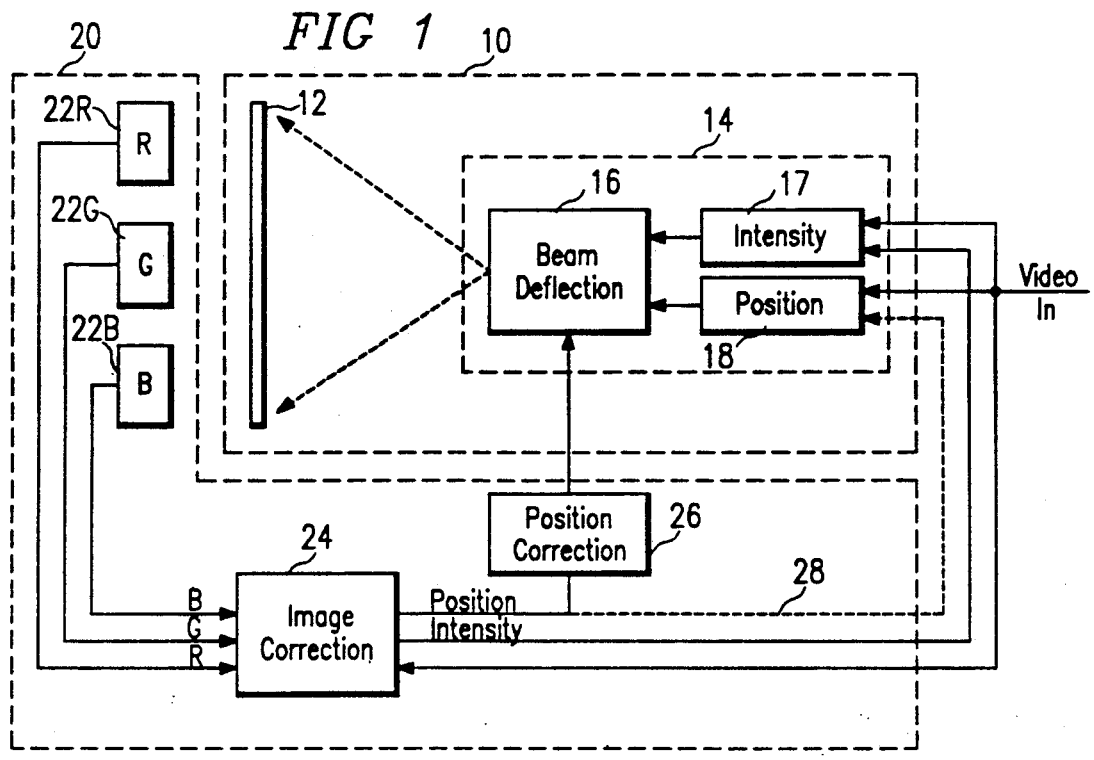
FIG. 1 is a system functional diagram of a color image display system, together with a color image correction system in accordance with the present invention.

As shown in FIG. 1, a conventional color CRT display system 10 includes a color display 12 with a color phosphor coating, and an image beam generator 14.

Color display 12 is a standard color CRT screen in which the color phosphor coating comprises an array of color pixels arranged in a raster-scan pattern. Each pixel includes three color phosphor elements—red, green and blue (RGB)—arranged in a triangular pattern.

Image beam generator 14 uses a single electron gun to provide a single image beam. Functionally, it includes image beam deflection control 16, together with intensity control 17 and beam position control 18. For this Detailed Description, beam deflection denotes the raster scanning function of beam deflection control 16, while beam positioning denotes the higher frequency deflection (or positioning) of the image beam within a pixel to create a composite pixel color output, corresponding to the modulation of beam raster-scan deflection signals with higher frequency beam position signals developed from the color signal component (chrominance) of the input video signal.

Beam deflection control 16 includes the electron beam gun and standard electron beam deflection components (electromagnetic and/or electrostatic). It produces an image beam that is raster-scanned across color display 12, providing appropriate electrical excitation of the color phosphor elements.

Intensity control 17 is responsive to the luminance component of the input video signal to correspondingly modulate the beam current for the electron beam gun in beam deflection control 16. This modulation function controls electron beam intensity, and thereby display image intensity, for each pixel. Beam position control 18 is responsive to the chrominance component of the input video signal to provide a second order, high frequency beam position signal that modulates the raster-scan deflection provided by beam deflection control 16. That is, for each pixel, beam position control 18 provides a high frequency beam position signal that causes beam deflection control 16 to precisely position (deflect) the image beam within the pixel (with respect to the constituent RGB color phosphor elements) thereby providing the desired color output in terms of an RGB color amplitude ratio (see Section 3).

2. Display Image Correction System

A display image correction system 20 includes RGB optical detectors 22R, 22G and 22B, and an image correction subsystem 24. The image correction subsystem is responsive to component color amplitude detector signals from the RGB detectors, and to the input video signal, to generate beam position and intensity correction signals on a pixel-by-pixel basis.

RGB optical detectors 22R, 22G and 22B provide respective detector signals corresponding to the RGB color amplitudes of the color image on display 12. That is, for each pixel, the RGB detectors 22R, 22G and 22B generate RGB color-amplitude detector signals representative of the respective color phosphor outputs resulting from image beam illumination of the pixel. Thus, the composite of RGB detector signals provides a measure of the RGB component color ratio, which corresponds to the position of the image beam within the pixel relative to the constituent RGB color phosphor elements.

The RGB color-amplitude detector signals are input to the image correction subsystem 24. The image correction subsystem is responsive to the RGB detector signals representative of color display image output, and to the video input, to provide position and intensity correction signals to the image beam generator 14. That is, RGB detectors 22R, 22G and 22B, and image correction subsystem 24 form a negative feedback loop to provide high frequency position and intensity correction signals that, for each pixel, correct in real time any deviation in beam position (i.e., color output) or intensity.

Using CRT color correction system 20 to provide real-time position and intensity correction for a standard color CRT system requires that the bandwidth available from beam intensity control 17 and beam position control 18 be considered. Conventional image beam generators typically implement intensity (beam current) control with a sufficient margin of bandwidth to accommodate any intensity correction provided by the image correction system. However, conventional image beam generators typically do not implement beam position (color) control with a sufficient margin of bandwidth to permit the superposition of a high frequency position correction signal from the image correction system for second-order correction modulation of the normal beam position signals.

In that case, the image correction subsystem 24 includes a position correction network 26 responsive to a position correction signal from the image correction subsystem to provide the high frequency beam position correction signal. This beam position correction signal provides a second-order position correction modulation superimposed on the first-order beam position modulation from the CRT's beam position control 18, thereby correcting beam position errors in real time. Position correction network 26 can be eliminated if the CRT's image beam generator 14 does include sufficient beam position control bandwidth, so that the position correction signal from the image correction subsystem 24 can be provided directly (28) to the CRT's beam position control 18. Position Correction Network 26 may include additional high frequency deflection elements.

Figure 2:
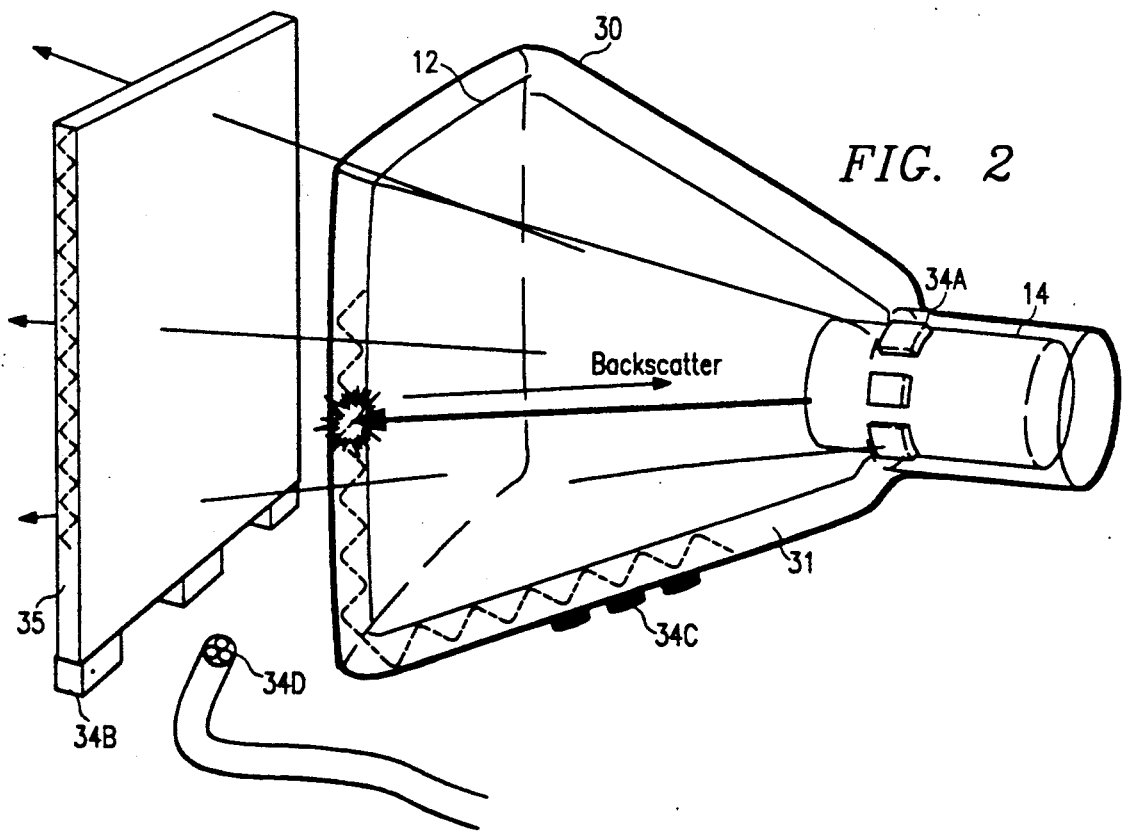
FIG. 2 shows a cathode ray tube, and illustrates three alternative schemes for detecting color image output.

As shown in FIG. 2, several alternatives are available for locating the RGB color-amplitude detectors with respect to a CRT unit. If the image correction system is to be incorporated into the design of a color CRT system, then the recommended approach is RGB detectors 34A located on the image beam generator structure. In this configuration, RGB detectors 34A detect color output from backscatter light emitted from the color phosphor coating. This recommended configuration has the advantage of being sealed by the CRT glass envelope 31 from dust and ambient light.

If the image correction system is to be retrofitted to an existing color CRT system, then the recommended approach is to provide a light-pipe plate 35, on which are located RGB detectors 34B. The display image output from the phosphor coating on display 12 transmits through the light-pipe plate, causing low-amplitude internally reflected light that is detected by RGB detectors 34B.

As alternatives to these preferred detector locations, the RGB detectors can be located on the outside of CRT glass envelope 31 (34C) or in front of the color display 12 (34D). Detectors 34C detect optical output that is channeled through internal reflections along the glass envelope 31. Detectors 34D are positioned to directly detect optical output from the color display 12.

The location of the RGB color-amplitude detectors is not critical to the present invention, being a matter of routine design choice. Typically, these detectors will be opto-electric devices that convert optical energy into an electrical signal representative of respective RGB color amplitude. An alternative arrangement is illustrated by RGB detector 34D, which comprises a three-cable fiber optic detector that merely captures optical output and transmits it through the fiber optic cables to an opto-electric converter (not shown). A fiber optic pick-up with a remote opto-electric converter can be used in any of the alternative locations for the RGB detectors.

Detector accuracy can be affected by any number of factors including detector location. Thus, whenever located, the RBG detectors will have to be calibrated, at least initially. Such calibration may be accomplished through calibration adjustments to the opto-electric detectors or any associated amplifiers in the image correction subsystem. Alternatively, detector correction factors for each pixel may be generated during a calibration procedure and stored (such as in an EEPROM) for table look-up during image correction processing. This detector calibration function can be accomplished in a conventional manner, and will not be described in detail.

3. Beam Position Detection

Figure 3A:
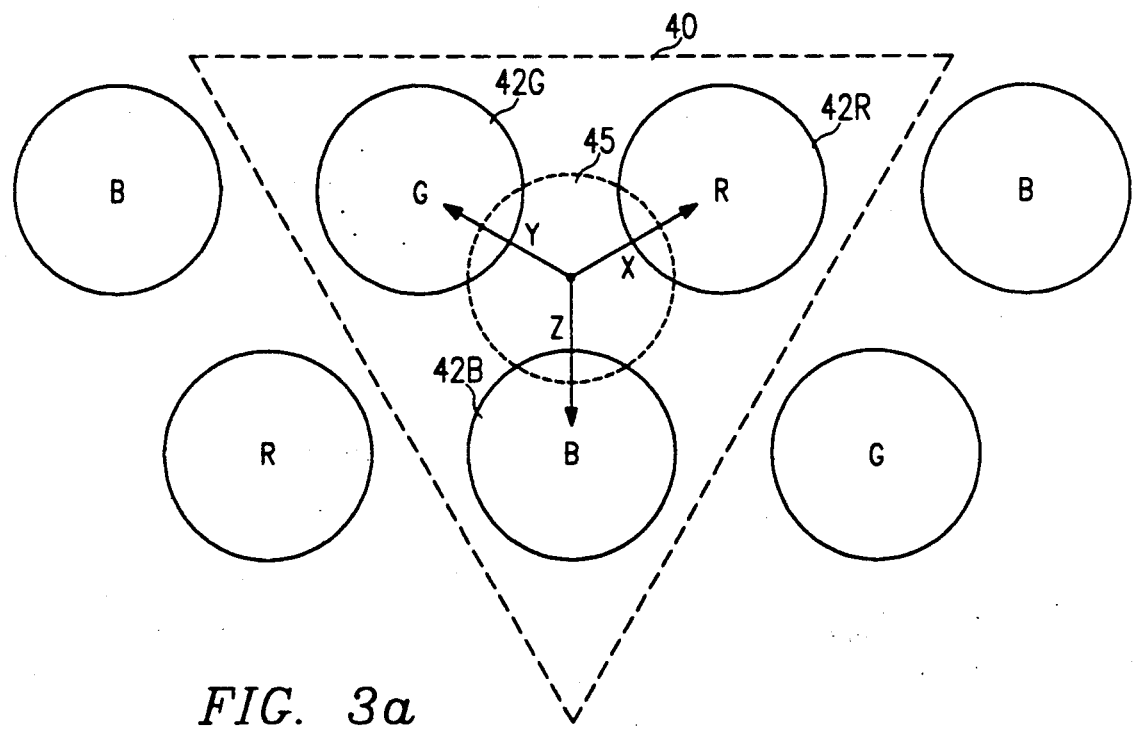
FIGS. 3a and 3b illustrate an RGB picture element, along with a representative plot of color intensity.

FIG. 3a illustrates a color phosphor pattern comprising an array of tri-color pixels 40, each including RGB color phosphor elements 42R, 42G and 42B. An incident electron beam 45 is shown superimposed on the center of pixel 40, illuminating equal portions of the RGB color phosphors 42R, 42G and 42B.

Figure 3B:
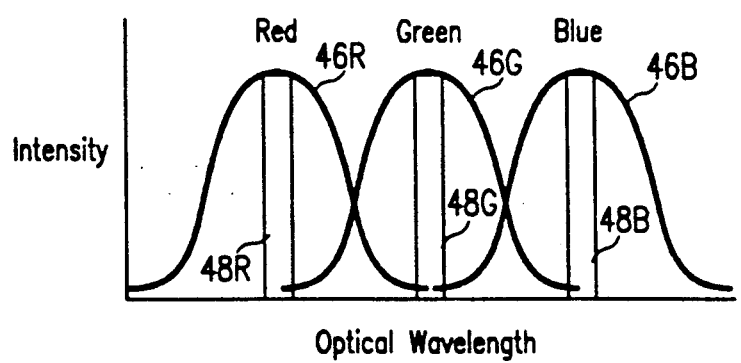

FIG. 3b illustrates the color profile of a pixel 40 in terms of intensity (color amplitude) and optical wavelength. Thus, the color profile of a pixel 40 includes red, green and blue waveforms 46R, 46G and 46B, representative of optical amplitude (intensity) at a given wavelength. Each color waveform includes a respective color filter band-pass regions 48R, 48G and 48B that defines the corresponding single-color output from the pixel when the incident electron beam 45 is positioned directly over one of the three color phosphor elements.

The color output from a pixel 40 is determined by the position within the pixel of electron beam 45, which is defined in terms of an XYZ coordinate system representative of electron beam position in, respectively, the direction of the red, green and blue color phosphor elements. Thus, if electron beam 45 is centered in the pixel (0, 0, 0), then equal portions of the respective RGB color phosphor elements are illuminated, yielding equal color output (absent non-uniformity in phosphor efficiency) from each phosphor color element (i.e., the color white). Maximum deflection of the electron beam 45 in the X direction (1, 0, 0) centers the beam on the red color phosphor element 42R, yielding an entirely red color output. Similarly, maximum deflection of the image beam 45 in the Y (0, 1, 0) or Z (0, 0, 1) directions centers the beam on, respectively, the green or blue color phosphor elements 42G or 42B. Color output from the pixel is determined by the XYZ position of electron beam 45 within the pixel, yielding a corresponding ratio of color component outputs from the RGB color phosphor elements 42R, 42G and 42B.

FIGS. 4a–4d illustrate the effect of a change in position of the incident electron beam within a pixel, either in response to the input video signal, or as a result of errors in beam positioning. Here, it is assumed that color output error results from image beam positional errors, rather than non-uniformities in phosphor efficiency.

FIG. 4a shows a pixel 50 in which the image beam 55a is centered within the pixel. This image beam position produces a color output with equal color amplitudes for the RGB color phosphors. This condition is represented in FIG. 4b by an RGB detector output with color components $R_D G_D B_G$ of equal color amplitude.

FIG. 4c shows the same pixel 50 in which the incident electron beam 55 is shifted in position in the Y direction toward the green color phosphor element. As indicated by FIG. 4d, this positional shift in image beam 55b causes a corresponding shift in the output from pixel 50 as represented by the reduced color amplitudes detected for color components $R_D$ and $B_D$ and an increased color amplitude for the green color component $G_D$.

4. Image Correction Subsystem (Real-Time)

Figure 5A:
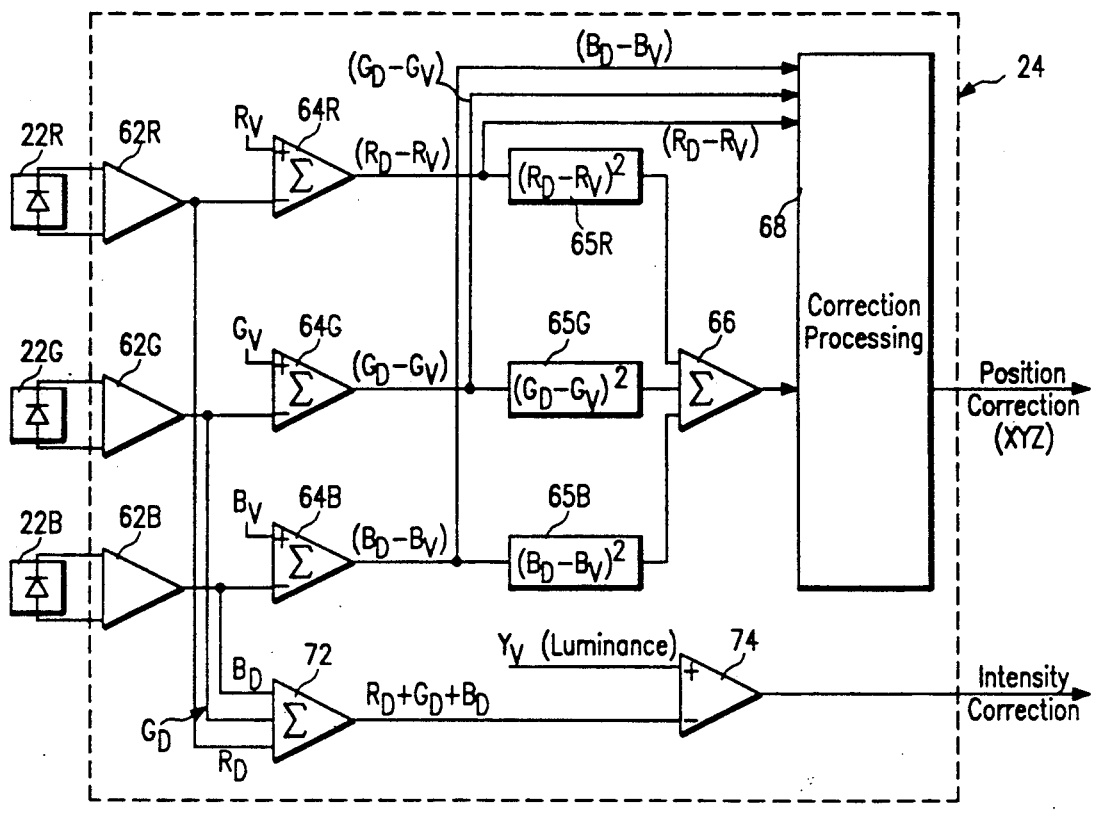
FIGS. 5a and 5b show the color correction subsystem for real time color correction in a CRT system using, respectively, one and three image beams.

Image correction subsystem 24 (FIG. 1) implements a real time correction of beam position and intensity using negative feedback to correct, on a pixel-by-pixel basis, deviations in the output display image from the input video image (both luminance and chrominance). FIG. 5a functionally diagrams a preferred analog implementation of image correction subsystem 24 for a single-image-beam color CRT system, and FIG. 5b functionally diagrams a preferred analog implementation for a three-image-beam color CRT system.

As shown in FIG. 5a, color output from the color display is detected as RGB color amplitudes (see FIG. 4b) by respective opto-electric RGB detectors 22R, 22G and 22B. For each pixel, these detectors provide an electrical signal representative of the color amplitude for a respective RGB component of the pixel. These RGB detector signals are applied to respective amplifiers 62R, 62G and 62B, which output amplified component color amplitude signals RD, GD and BD representative of respective RGB detector outputs.

One channel of image correction subsystem 24 generates a position correction signal to correct chrominance errors represented by errors in the RGB color components. The amplified detector signals $R_D$, $G_D$ and $B_D$ are applied to respective difference amplifiers 64R, 64G and 64B, which receive as their other respective inputs (from the CRT's image beam generator) the corresponding color component amplitudes of the input video signal $R_V$, RGB $G_V$ and $B_V$. These difference amplifiers output respective RGB delta values $(R_D - R_V)$, $(G_D - G_V)$ and $(B_D - B_V)$ representative of color output errors. Image correction subsystem 24 may also implement a detector calibration function, such as by including a calibration-factor look-up EEPROM and a D/A converter, together with associated processing capability.

These RGB color delta values are squared by respective squaring elements 65R, 65G and 65B, and then summed by a summing amplifier 66. The sum-of-the-squares output from summing amplifier 66 is input to a correction processing network 68. The correction processing network 68 also receives directly the RGB delta values $(B_D - B_V)$, $(G_D - G_V)$ and $(R_D - R_V)$. Correction processing network 68 implements a standard sum-of-the-least-squares feedback function to provide a position correction signal that corrects errors in beam position within a pixel, using the RGB delta values to determine the sign of the correction.

A second channel of image correction subsystem 24 provides an intensity correction signal to correct image luminance. The amplified color amplitude signals from respective RGB detectors 22R, 22G and 22B are input to a summing amplifier 72, and the summed output is input to a difference amplifier 74. Difference amplifier 74 receives as its other input (from the CRT system's image beam generator) the luminance component $Y_v$ of the input video signal. The output from difference amplifier 74 is the intensity correction signal that corrects errors in intensity.

For a preferred embodiment, the image correction system uses static image detection with no provision for detecting pixel color output as a function of scan time across the pixel. In a static image approach to detecting color output errors, the image correction subsystem does not distinguish between color output errors caused by position errors or by phosphor inefficiencies or degradation. Color output errors represented by the amplified detector signals $R_D G_D B_D$ are treated as position errors, and corrected through repositioning the image beam.

While the static image implementation of image correction subsystem 24 described in connection with FIG. 5a does not differentiate between first order errors in position and intensity, a dynamic implementation of the image correction function could differentiate first order positional and intensity errors. For example, the image correction subsystem could be implemented dynamically by using the known geometric structure for both the image beam and a phosphor element (both circular) to generate for each pixel, a dynamic intensity/time profile representative of the position of the image beam as it scans across the pixel. Either a digital or analog passive filter would be used to dynamically measure image beam position errors, as distinct from pixel intensity errors caused by phosphor degradation. Because of cost considerations, such a dynamic implementation of the image correction function is not recommended, but nevertheless, represents a routine design choice in implementing the CRT color correction technique of this invention.

Figure 5B:
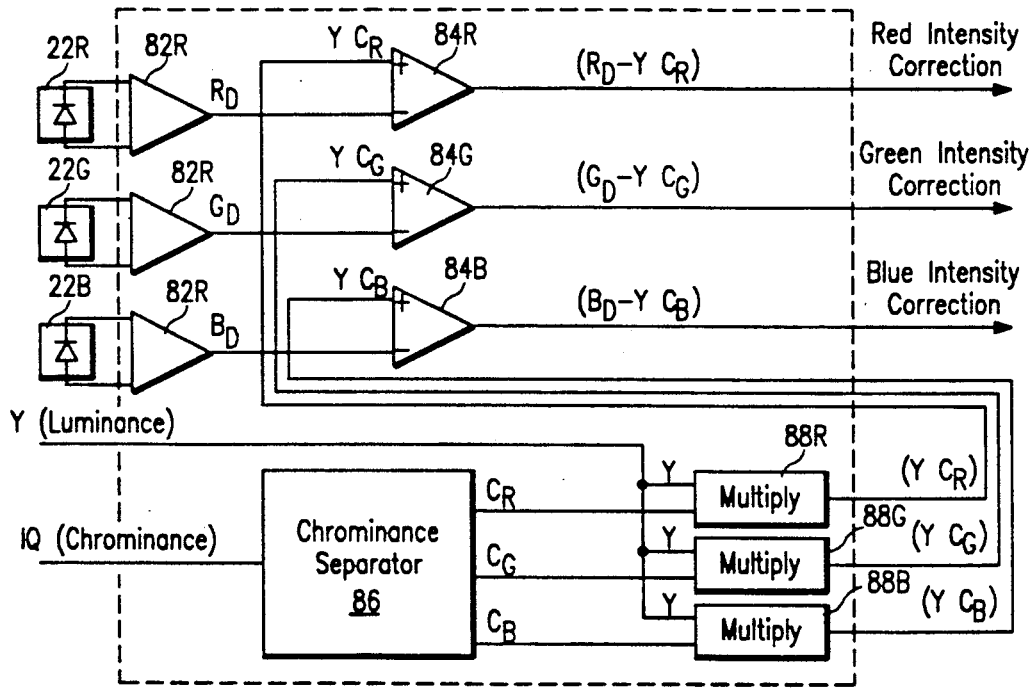

FIG. 5b shows an analog implementation of image correction subsystem 24 for a three-image-beam color CRT system. For a three-beam system, each color phosphor component of a pixel is scanned by a separate electron beam aligned with that pixel component, with component color output being determined by beam intensity. In this system, the color amplitude components that determine the color output of a pixel are relatively independent of beam position, being primarily dependent upon the relative intensities of the separate image beams illuminating the color phosphor elements of a pixel (taking into account differences in phosphor efficiency).

The three image beams essentially generate separate RGB color images, each with an associated luminance (intensity), which are superimposed in time to create the output color display image. Since the chrominance (color ratio) component of the input video signal represents a corresponding color fraction for each color, the color output from a color phosphor element is equal to the chrominance value for that color component times the total luminance for the input video signal. That is, for each color phosphor element of a pixel, the color-amplitude output should be equal to the product of the corresponding chrominance color fraction and the total luminance for the input video signal.

Using this relationship between chrominance and luminance, the preferred implementation of the image correction subsystem 24 for a three-image-beam color CRT system includes respective color component amplifiers 82R, 82G and 82B that amplify the corresponding RGB color-amplitude detector signals from RGB detectors 22R, 22G and 22B, providing amplified detector signals $R_D$, $G_D$ and $B_D$. These amplified RGB detector signals are input to respective difference amplifiers 84R, 84G and 84B, which also receive a corresponding luminance/chrominance product.

The chrominance component (IQ) of the input video signal (obtainable from the color CRT system) is applied to a chrominance separator 86 that provides respective chrominance color-fraction values $C_R$, $C_G$ and $C_B$. These chrominance values are input to respective multipliers 88R, 88G and 88B, which receive as their other inputs the luminance component of the input video signal (obtainable from the color CRT system). Multipliers 88R, 88G and 88B provide the respective products $(YC_R)$, $(YC_G)$ and $(YC_B)$, representative of the RGB color amplitudes that should be detected for a pixel if the respective RGB image beam intensities are accurate (for a given phosphor efficiency level).

The difference amplifiers 84R, 84G and 84B provide respective difference outputs $(R_D - YC_R)$, $(G_D - YC_G)$ and $(B_D - YC_B)$, that are the intensity correction signals output from image correction subsystem 24. These component intensity correction signals provide beam current correction for the respective electron guns, adjusting intensity to adjust color output on a pixel-by-pixel basis.

The real-time image correction method of this invention for color CRT systems is readily adaptable to monochrome CRT systems. In monochrome systems, which of course use a single image beam, display image errors are primarily intensity errors caused by image beam intensity (beam current) errors or phosphor degradation. Thus, a single optical amplitude detector would be used, along with an intensity correction subsystem analogous to the intensity correction channel of the image correction subsystem for the single-image-beam color CRT system (24 in FIG. 5a).

The analog implementations for the image correction subsystems described in connection with FIGS. 5a (single-image-beam) and 5b (three-image-beam) are preferred over alternative digital implementations because of the bandwidths currently available from analog systems compared to digital signal processors comparable in cost. A signal processing bandwidth of 40 MHz is readily available from analog implementations of image correction subsystem 24. In contrast, any comparable implementation by digital signal processing would be technically infeasible (due to bandwidth limitations), or prohibitively expensive. Nevertheless, those skilled in the art recognize that this limitation on the use of digital signal processing to implement a real-time image correction system for color CRT systems in accordance with this invention are economic and not technological. That is, implementing the real time image correction techniques of this invention using digital signal processing, once comparable bandwidths are obtainable at comparable costs, is a matter of applying routine skill in the digital signal processing art.

5. Image Correction Subsystem (Stored Correction Factor)

Despite current economic/bandwidth limits on the practicality of implementing a real time color CRT image correction system using digital signal processing, the use of digital processing in CRT control applications is advantageous due to the increasing amount of digital processing capability being built into current image display systems. A digital implementation of the image correction method of the present invention using a sampled (rather than real time) approach is currently practical.

Figure 6:
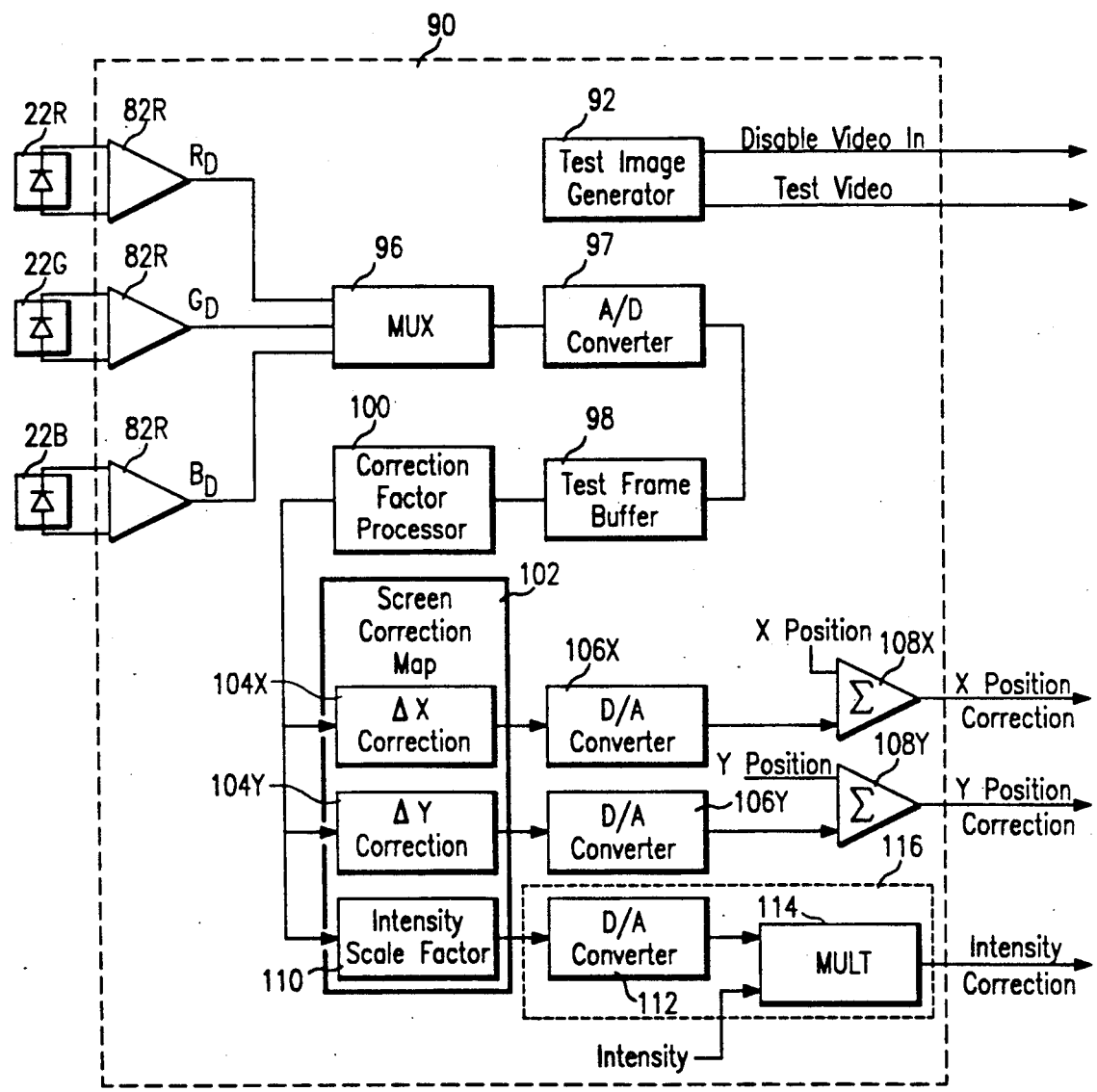
FIG. 6 shows a digital color correction subsystem using stored-correction-factors to provide color correction in a single-image-beam CRT system.

FIG. 6 functionally diagrams a digital image correction subsystem for implementing the image correction method of this invention for a single-image-beam color CRT system. Image correction factors are calculated using test images to periodically sample image display errors, and then stored for use in image correction during normal video image scanning.

An image correction subsystem 90 includes a test image generator 92. Under program control, test image generator 92 initiates a sampling operation by blocking the input video signal and injecting into the display video channel a test video signal. This test video image need be no more than 1/30th of a second in duration, and therefore, imperceptible to a viewer.

The selection and generation of a test image is not critical to this image correction implementation, provided that each component color phosphor element of each pixel on the display is tested at some predetermined interval. The recommended approach is to provide successive solid-color red, green and blue test images.

During the display of a test image for each pixel, the RGB detectors 22R, 22G and 22B provide respective RGB detector signals representative of component color amplitude. These RGB detector signals are amplified by respective amplifiers 94R, 94G and 94B to provide respective amplified color-amplitude signals $R_D$, $G_D$ and $B_D$. Image correction subsystem 90 may also implement a detector calibration function, such as by including a calibration-factor look-up EEPROM and an associated D/A converter (with associated processing being provided by existing digital processing capability).

The amplified detector signals $R_DG_DB_D$ are input through a multiplexer 96 to an analog/digital converter 97. A/D converter 97 converts, pixel-by-pixel, the analog $R_DG_DB_D$ color-amplitude signal into RDGDBD color-amplitude bytes. The $R_DG_DB_D$ color-amplitude bytes from A/D converter 97 are sequentially stored in a test frame buffer 98, effecting a sampling of an entire display frame for each raster scan. For the recommended approach to test image sampling, a single-color RGB test image is generated at a time, and a corresponding single-color display output frame is detected (sampled) and applied (pixel-by-pixel) through multiplexer 96 and A/D converter 97. The sampled display frame is stored as $R_DG_DB_D$ color-amplitude bytes (one byte for each color) in test frame buffer 98. Thus, if a Red test image is displayed, for each pixel, the resulting $G_D$ and $B_D$ bytes will indicate zero color amplitude unless a beam position error occurs.

When an entire display frame is sampled, and the representative $R_DG_DB_D$ color-amplitude bytes are stored in test frame buffer 98, the display frame is retrieved by a correction factor processor 100. The correction factor processor 100 sequentially reads the $R_DG_DB_D$ color-amplitude bytes representing a display image frame from test frame buffer 98, and compares each with a corresponding nominal color-amplitude value representative of the test image for that pixel. The correction factor processor 100 generates corresponding pixel-by-pixel image correction factors that are stored in three screen correction maps in a memory 102. Two of the maps contain, for each pixel, a respective two-coordinate (such as orthogonal XY) beam position correction factor: (a) a delta-X correction map 104x stores position correction factors for the X coordinate; and (b) a delta-Y correction map 104y stores position correction factors for the Y coordinate.

This approach to generating the position correction factors (using a single-color test image) is a design choice, and any number of other schemes will be readily apparent, and may be routinely implemented, by those skilled in the art.

When position correction factors for each pixel are stored in the delta-X and delta-Y correction maps 104x and 104y in memory 102, they are available to provide respective beam position correction signals for each pixel during each raster-scan. Thus, during each display frame, as pixels are raster scanned, the corresponding delta-X and delta-Y correction factors from respective screen maps 104x and 104y are sequentially read in synchronism with the scan, and applied to respective digital/analog converters 106x and 106y.

The analog output from these D/A converters is input to respective summing amplifiers 108x and 108y, which also receive from the color CRT system respective X and Y beam position signals representative of the input video signal. The corrected X and Y position signals are output from respective amplifiers 108x and 108y, and are used to provide a corrected beam position that effects the color correction embodied in the delta-X and delta-Y correction factors stored in memory maps 104x and 104y. Correction factor processor completes 100 a cycle of sequentially reading through the memory maps 104x and 104y each display frame, providing corresponding corrected beam position signals pixel-by-pixel.

For each test image, correction factor processor 100 also generates intensity scale factors (bytes) stored in an intensity correction map 110 in memory 102. The correction factor processor processes the retrieved $R_DG_DB_D$ color-amplitude bytes to obtain corresponding pixel intensity values representative of the display image intensity.

For each pixel, the intensity correction scale factor is the ratio of nominal (test image input) intensity to actual (display image output) intensity for the pixel. Intensity correction factors are stored as ratios because pixel intensity is a (first order) linear function of beam current and pixel efficiency. That is, pixel intensity is a first-order product function (i.e., the product of an image beam intensity factor and a pixel efficiency factor) that degrades linearly, and therefore, requires a multiplicative scale factor of intensity correction.

During each frame, as pixels are scanned, corresponding intensity correction scale factors (bytes) are sequentially read from intensity correction map 110 in synchronism with the scan. The intensity correction scale factor bytes are input to a digital/analog converter 112. The analog output from D/A converter 112 is applied to a multiplier 114, which also receives from the CRT system the intensity component of the input video signal. This input intensity is multiplied by the intensity correction scale factor signal, and a corrected intensity signal is output from image correction subsystem 90.

The functions of D/A converter 112 and multiplier 114 are preferably implemented by a combined D/A multiplier 116 in which the input video intensity is used as the reference voltage for the D/A conversion (performing the multiplication function automatically).

This digital implementation of a stored-correction-factor approach to CRT image correction in accordance with this invention is readily adaptable to a three-image-beam color CRT system or to monochrome CRT systems by the straightforward extension of the intensity correction function. In particular, for three-image-beam color CRT systems, three identical intensity correction channels would be used, one for each image beam. That is, the correction factor processor would output separate intensity correction scale factors for each color, which would be separately stored in respective intensity correction maps. As the three-image-beam system scans each pixel, the corresponding RGB intensity correction scale factors would be sequentially read from the corresponding intensity correction maps, and used to provide corresponding corrected RGB intensity signals from the image correction subsystem.

6. Positionally Fixed Displays

The image correction method of this invention is readily adaptable to positionally fixed displays, such as LCD and LED displays, in which pixel position is structurally fixed rather than being determined by a scanned image beam. For these displays, pixel image intensity is the only variable, so that image correction is limited to intensity correction. Intensity correction for passive displays is analogous to intensity correction for single-image-beam color CRT systems or monochrome CRT systems. For these analogous systems, image correction also depends on correcting pixel image intensity (which may deteriorate due to pixel inefficiencies or image beam intensity variations). The related portions of the Detailed Description, and in particular the description of the intensity correction channel of the image correction subsystem for the single-image-beam color CRT system, provides the disclosure necessary for those skilled in the art to readily implement the intensity correction techniques of this invention, using either a real-time or sampled approach, for these displays.

7. Conclusion

The display image correction system and method of this invention detects display image output errors as pixel-by-pixel deviations in display image output from the input image, and provides corresponding image correction signals to the display system's image generator, enabling the display image to be corrected in accordance with the input image. The display image correction method can be implemented either on a real-time basis using real-time correction factors generated in response to detected image output, or on a sampled basis using stored correction factors calculated from sampled test image output and stored in a memory map for retrieval in synchronism with the display system's image generator.

Although the present invention has been described with respect to a specific, preferred embodiment, various changes and modifications may be suggested to one skilled in the art, and it is intended that the present invention encompass such changes and modifications as fall within the scope of the appended claims.

What is claimed is:

1. A display image correction system for a display imaging system including a color display defined by an array of pixels in which each pixel is characterized by three color components, each responsive to a pixel control signal for providing an optical pixel output, the combined pixel outputs forming a display image, and an image generator using a single image beam responsive to an input image signal representative of an input image for providing pixel control signals to form a display image, comprising:
   a test image generator for selectively providing, during a test image interval, a test image signal representative of a test image of a single color component to the image generator, which provides the pixel control signals to form a display test image frame;
   an image detector subsystem for detecting, for each pixel, a selected pixel image attribute of the pixel output during a test image frame, and generating a corresponding pixel output detector signal;
   an image correction subsystem responsive to the pixel output detector signals resulting from a test image frame for generating, from the pixel output detector signal for each pixel, position and intensity correction factors representative of a deviation in detected pixel output with respect to the input test image;
   a correction factor memory map for storing, for each pixel, at least two position correction factors and an intensity correction scale factor such that said correction factors representative of a deviation in detected pixel output with respect to the input test image;
   a correction factor memory map for storing, for each pixel, at least two position correction factors and an intensity correction scale factor such that said correction factor memory map contains a sampled frame of image correction factors;
   said image correction subsystem sequentially retrieving the image correction factors stored in said correction factor memory signals for the image generator in synchronism with the input image signal, such that the image generator provides, for each pixel, a corrected pixel control signal to the display, thereby correcting the display image to correspond to the input image.

2. The display image correction system of claim 1, wherein said image correction subsystem generates image correction factors for predetermined ones of the pixels during a single test image frame, such that image correction factors are generated for all pixels during successive test image frames.

3. A method of correcting an image display for a display imaging system including a color display defined by an array of pixels in which each pixel is characterized by three color components, each responsive to a pixel control signal for providing an optical pixel output, the combined pixel outputs forming a display image, and an image generator using a single image beam responsive to an input image signal representative of an input image for providing pixel control signals to form a display image, comprising the steps:
   selectively providing, during a test image interval, a test image signal representative of an input test image of a single color component to the image generator, which provides the pixel control signals to form a display test image frame;
   detecting, for each pixel, a selected pixel image attribute of the pixel output, and generating a corresponding pixel output detector signal;
   generating, in response to the pixel output detector signals corresponding to a display test image frame, for each pixel, position and intensity correction factors representative of a deviation of the detected pixel output for that pixel from the pixel output associated with the input test image frame;
   storing at least two position correction factors and an intensity correction scale factor for each pixel, thereby obtaining a sampled frame of image correction factors; and
   sequentially retrieving in synchronism with the input image signal the stored position and intensity correction factors, and providing, for each pixel, an image correction signal corresponding to the image correction factor to the image generator to obtain a corrected pixel control signal such that the display image corresponds to the input image.

4. The display image correction system of claim 1, wherein said test image interval is selected such that said test image is substantially imperceptible to a viewer.

5. The display image correction system of claim 1 further comprising:
calibration-factor storage for storing predetermined detector calibration factors that calibrate the output of said image detector subsystem; and
said image correction subsystem retrieving said calibration factors and using them to calibrate the image correction signals that are generated using the image correction factors.

6. The display image correction system of claim 1, wherein said image correction subsystem includes:
a test frame buffer for storing a sampled display frame corresponding to the pixel output detector signals from a selected test image;
said sampled display frame being stored as color component bytes, with a color component byte for each color component being associated with each pixel;
such that, for the single-color test image, the resulting color component bytes in said sampled display frame for each pixel indicate zero color amplitude for the color components other than the test-color component, unless a beam position error occurs.

7. The display image correction system of claim 6, wherein said image correction subsystem includes an image correction processor that:
retrieves the color component bytes from said test frame buffer;
compares the three color component bytes for each pixel with corresponding nominal values associated with the test-color component of the test image; and
using this comparison, generates pixel-by-pixel said position correction factors.

8. The display image correction system of claim 7, wherein said position correction factors are respective orthogonal X and Y coordinate beam position correction factors.

9. The display image correction system of claim 1, wherein said intensity correction scale factors comprise, for each pixel, a ratio of
a nominal test image input intensity value; and
an actual test display image output intensity value;
thereby providing a multiplicative correction scale factor.

10. The display image correction system of claim 1, wherein the single-color test images from said test image generator are successively of each of the three color components.

11. The display image correction method of claim 3, wherein the step of selectively providing a test image signal is performed such that said test image interval is short enough that said test image is substantially imperceptible to a viewer.

12. The display image correction method of claim 3 further comprising:
the step of storing predetermined detector calibration factors that calibrate the output of said image detector subsystem;
wherein the step of sequentially retrieving stored position and intensity correction factors includes retrieving said calibration factors and using them for calibration in providing image correction signals.

13. The display image correction method of claim 3, wherein the step of generating position and intensity correction factors comprises the steps:
in response to the pixel output detector signals, storing a sampled display frame of color component bytes, with each pixel being associated with a color component byte for each color;
such that, for the single-color test image, the resulting color component bytes in said sampled display frame for each pixel indicate zero color amplitude for the color components other than the test-color component, unless a beam position error occurs; and
using the color component bytes, generating position and intensity correction factors representative of a deviation of the detected pixel output for that pixel from the pixel output associated with the input test image frame.

14. The display image correction method of claim 13, wherein the step of generating position and intensity correction factors comprises the steps:
retrieving the color component bytes from said test frame buffer;
comparing the three color component bytes for each pixel with corresponding nominal values associated with the test-color component of the test image; and
using this comparison, generating pixel-by-pixel said position correction factors, and computing an intensity correction factor as a ratio of nominal test image input intensity value and actual test display image output intensity value.

15. The display image correction method of claim 3, wherein the step of selectively providing a single-color test image is accomplished by successively providing test images of each of the three color components.

* * * * *